United States Patent
Copeland, III

[15] 3,680,066

[45] July 25, 1972

[54] SINGLE WALL DOMAIN FANOUT CIRCUIT

[72] Inventor: John Alexander Copeland, III, Gillette, N.J.

[73] Assignee: Bell Telephone Laboratories, Incorporated, Murray Hill, N.J.

[22] Filed: July 8, 1971

[21] Appl. No.: 160,842

[52] U.S. Cl. ....................................340/174 TF, 340/174 EB
[51] Int. Cl. ....................................G11c 11/14, G11c 19/00
[58] Field of Search ...............................340/174 TF, 174 EB

[56] References Cited

OTHER PUBLICATIONS

Scientific American " Magnetic Bubbles" by Bobeck et al., 6/71, p. 78–90.

IBM Tech. Disclosure Bulletin, " And/Or Combinatorial Bubble Domain Logic Device" by Almasi et al., Vol. 13, No. 6, 11/70, p. 1410.

IBM Tech. Disclosure Bulletin, " Read/Write Control" by Walker, Vol. 13, No. 11, 4/71, p. 3474–3475.

IBM Technical Disclosure Bulletin, " Biaxial Magneto–Resistive Sensing of Cylindrical Magnetic Domains" by Almasi et al., Vol. 14, No. 1, 6/71, p. 196–197.

*Primary Examiner*—Stanley M. Urynowicz, Jr.
*Attorney*—R. J. Guenther et al.

[57] ABSTRACT

A single wall domain fanout circuit is provided by an electrical conductor of serpentine geometry having consecutive loops of increasing amplitude. Increasing numbers of domains, associated with consecutive loops, propagate interactions therebetween responsive to an information domain.

11 Claims, 3 Drawing Figures

INVENTOR
J. A. COPELAND III
BY Herbert M. Shapiro
ATTORNEY

SINGLE WALL DOMAIN FANOUT CIRCUIT

1. Field of the Invention

This invention relates to date processing arrangements and more particularly to such arrangements in which information is represented as a pattern of single wall domains.

2. Background of the Invention

The term "single wall domain" refers to a magnetic domain which is movable in a layer of a suitable magnetic material and is encompassed by a single domain wall which closes on itself in the plane of that layer.

Propagation arrangements for moving a domain are designed to produce magnetic fields of a geometry determined by the layer in which a domain is moved. Most materials in which single wall domains are moved are characterized by a preferred magnetization direction, for all practical purposes, normal to the plane of the layer. The domain accordingly constitutes a reverse magnetized domain which may be thought of as a dipole oriented transverse, nominally normal to the plane of the layer. Accordingly, the movement of a domain is accomplished by the provision of an attracting magnetic field normal to the layer and at a localized position offset from the position occupied by the domain. A succession of such fields causes successive movements of a domain.

One suitable propagation arrangement for moving a domain comprises a pair of serpentine conductors aligned along an axis and offset from one another therealong to provide domain displacement along the axis when pulsed alternatively with bipolar pulses. My copending application Ser. No. 49,273 filed June 24, 1970 now U.S. Pat. No. 3,636,531 arrangement where serpentine conductors define a multistage domain propagation arrangement. A rail along the above-mentioned axis defines first and second stable positions for a domain to first and second sides thereof in each of the stages. A domain is moved along the rail in response to the pulses in the conductors without changing sides. In practice, the rail forms a closed loop and a domain is stored initially in each stage to a reference (zero) side of the rail. A binary one is stored by displacing a domain laterally from the reference side to the paired position in an input stage of the channel leaving an absent domain in the reference side. A logical consequence of the arrangement is that a domain to the "one" side of the rail is accompanied by an absent domain in the reference side as it moves about the channel. Of course the opposite is true also.

BRIEF DESCRIPTION OF THE INVENTION

The invention is based on the realization that there exists a zero force point with respect to an electrical conductor such that a domain at that point does not move when the conductor is pulsed. If increasingly large numbers of domains are arranged at such points with respect to consecutive legs of a multiloop serpentine conductor when a signal is applied thereto, the domains at such points (viz, tangent to the center of the conductor) do not move. Consequently, $2^n$ domains, where $n = 0, 1, 2,$ equals the number of the consecutive leg of the loops, can be positioned tangent to legs of consecutive loops of the serpentine conductor in positions where no movement of the domains occurs when the conductor is pulsed. The domain corresponding to the lowest amplitude leg is situated close to an information channel in a manner to be moved under the center of the conductor when an information domain is moved to interact with it. A bipolar signal on the conductor now moves the former domain to a position where it interacts with the domains of the next leg, and so on, thus causing displacement of an arbitrarily large number of domains for detection before the second portion of the bipolar signals restores the displaced domains.

DETAILED DESCRIPTION

Figure 1:
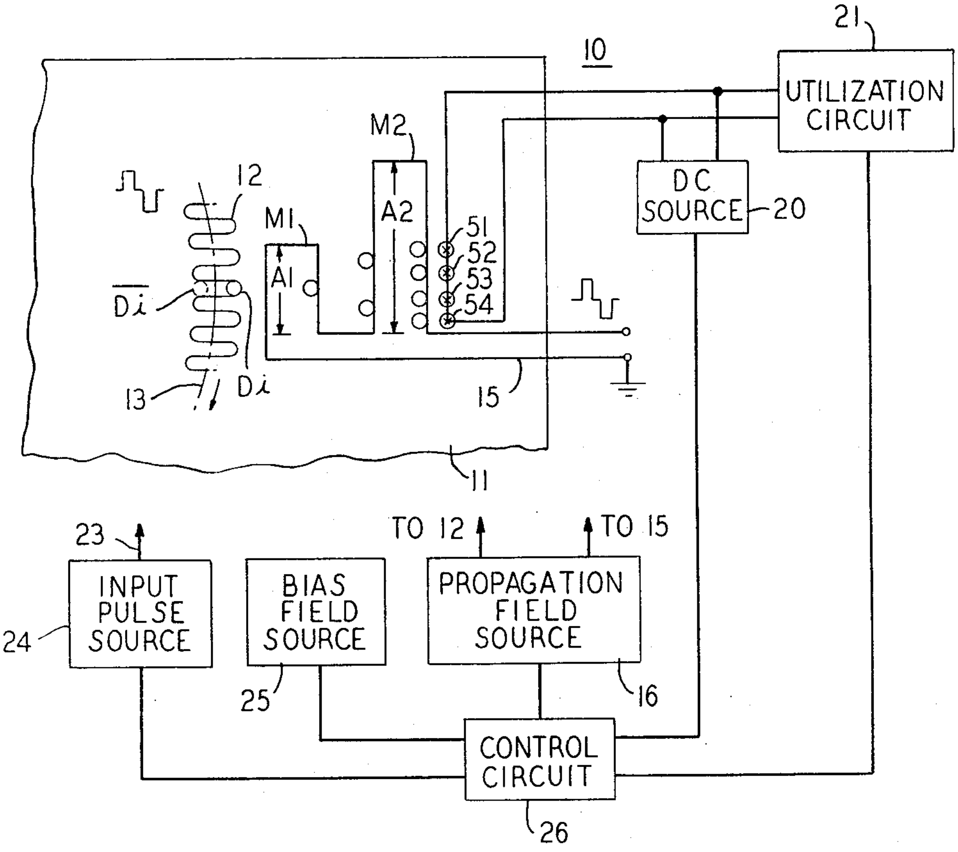
FIG. 1 is a schematic representation of a single wall domain detection arrangement in accordance with this invention.

FIG. 1 shows a fanout detection arrangement 10 in accordance with this invention. The arrangement comprises a layer 11 of a material in which single wall domains can be moved. A serpentine conductor 12 defines a multistage propagation channel along which domains are moved to either side of a rail represented by broken line 13. A full description of the illustrative rail arrangement may be found in my above-mentioned copending application. Suffice it to say herein that the propagation arrangement results in the movement of an information domain Di passed the (output) position shown in FIG. 1 for detection. The domain Di to the right of rail 13 in FIG. 1 represents a binary one. Were the domains to pass the output position to the left of rail 13, as indicated by the broken circle $\overline{Di}$, a binary zero would be represented.

A fanout detector arrangement is positioned with respect to the output position to respond to the presence of domain Di. The detector arrangement comprises a conductor 15 connected illustratively to a bipolar pulse source 16 which may be the same source of propagation pulses for movement of domains along channel 13. Such a source is represented by block 16 in FIG. 1 designated propagation pulse source in the figure. Conductor 15 is shown in FIGS. 1 and 2 including two loops designated M1 and M2 and showing domains in neutral and displaced positions with respect to the respective legs of consecutive loops of conductor 15.

The loops are of different geometry to enable the fanout operation in accordance with this invention. Specifically, the amplitude A1 of loop M1 is smaller than the amplitude A2 of loop M2. The reason for this difference in amplitude is to accommodate different numbers of domains. It is to be noted in FIG. 2 that one domain DM1 occupies a position with respect to the trailing leg of loop M1 while two domains D1FM2, and D2FM2 occupy positions with respect to the forward leg of loop M2. Domains D1TM2, D2TM2, D3TM2, and D4TM2 occupy positions with respect to the trailing leg of loop M2.

All the domains associated with conductor 15 normally occupy positions tangent to the conductor positions where signals therein are not operative to move the domains. This position is illustrated in FIG. 3 for a representative domain DM1 and a domain is maintained in this position illustratively by magnetically soft (permalloy) dots 17 as shown. Only when the domain is moved beneath the center line 18 of conductor 15, as shown by the broken circle in FIG. 3, is a signal in the conductor 15 operative to displace the domain to the position shown for domain DM1 in FIG. 2. Conductor 15 is positioned with respect to channel 13 of FIG. 1 so that a domain Di in the position shown in FIG. 1 displaces domain DM1 to the position of the broken circle in FIG. 3.

Figure 2:
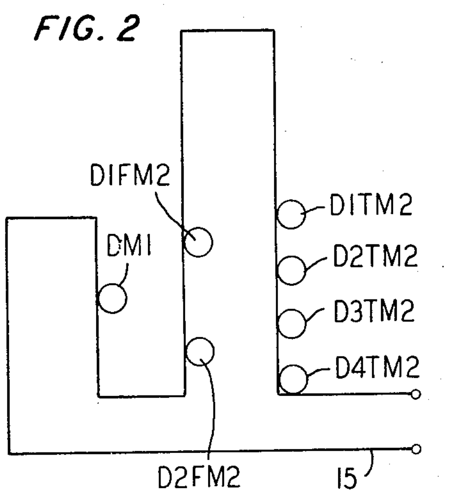
FIGS. 2 and 3 are schematic representations of a portion of the arrangement of FIG. 1.
Figure 3:
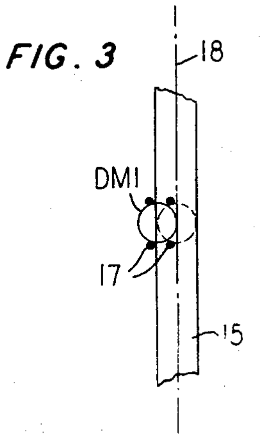

The current pulse in conductor 15 is operative at this juncture to move domain DM1 from the position shown in FIG. 1 to the position shown in FIG. 2. The normal positions for domains D1MF2 and D2MF2 is such that when domain DM1 is displaced, it moves domains D1MF2 and D2MF2 similarly under conductor 15 for later displacement to the positions shown in FIG. 2 in response to the pulses in conductor 15. Again, domains D1MF2 and D2MF2 similarly displace domains D1TM2 through D4TM2 under conductor 15 for movement to the positions shown in FIG. 2. It should be clear then that a fanout pattern is established wherein domain interaction displaces increasing numbers of domains associated with consecutive legs of the loops of a fanout serpentine conductor from neutral positions to active positions from which a first pulse on the conductor is operative to move domains along the axis of the conductor. The first pulse is followed by an oppositely poled pulse on the conductor to return domains to the originating active positions.

Particularly, if it is understood that the fanout conductor is connected electrically in series with the propagation conductor 12 of FIG. 1, the pulse that moves domain Di into an output position for displacing domain DM1 to an active position, thus initiating the fanout, is the same pulse that causes displacement of the fanout domain DM1 across a loop of conductor 15. Similarly, the following oppositely poled pulse which moves domain Di out of the output position is the same pulse which restores the domains DM1 to their originating active positions while displacing domains D1FM2 and D2FM2 to active positions. Domain Di, now absent, does not interact with domain DM1 and the latter returns to its neutral position as shown in FIG. 1 in readiness for responding to a next subsequent domain Di. Meanwhile, the next alternation of the pulse (viz, square wave) on conductor 15 moves domains D1TM2 through D4TM2 thereacross to the right as viewed to positions occupied by detectors 51, 52, 53, and 54 of FIG. 1.

Detectors 51 through 54 may be magnetoresistive devices now well known in the art, here connected electrically in series and having a dc current maintained therein via a dc source 20. The presence of a domain at each detector causes a change in resistance to the electrical current thereby applying a signal to utilization circuit 21 which is four times the voltage signal (approximately sixteen times the power) which would be expected from one single wall domain coupling one of the detectors. Consequently, interaction of an information domain with a first of a series of fanout domain sets permits an enhanced output signal.

It is important to note that the augmented signal is achieved at no reduction in data rates. We have spoken, for example, in terms of bipolar pulses on conductors 12 and 15, the former to move data domains, the latter to cause the fanout. But every pair of alternating pulses advances a new data (information) domain into the output position. Consequently, while domains D1TM2 through D4TM2 are moving to the detectors, the same pulse can be moving domain DM1 for initiating a next subsequent detection cycle if it were displaced by the data domain following Di. The fanout process, accordingly, is operative in what may be thought of as waves moving from left to right in FIGS. 1 and 2 where two waves may be in motion in the illustrative embodiment synchronized by the alternating drive pulses and, accordingly, avoiding a reduction in the data rate.

Of course, additional sets of fanout domains may be associated with additional loops (not shown) of conductor 15. Such additional sets of domains, if arranged in binary fashion, would provide outputs augmented to 8, 16, 32, times that which a single domain would occasion. Again, as added loops are employed, additional waves may be supported in the fanout structure so that it is clear that the data rate is not reduced. Consecutive loops of conductor 15 may have the form of arcs to accommodate increased numbers of domains.

Data domains for interaction with the fanout structure are introduced in the illustrative rail arrangement of FIG. 1 by displacement laterally across the rail from a reference side of the rail. This lateral displacement is accomplished typically by a pair of conductors represented by arrow 23 originating at an input pulse source represented by block 24 of FIG. 1. The operation of an input arrangement of this type is described in my above-mentioned copending application.

In operation, domain size is maintained constant by a familiar bias field represented in FIG. 1 by a block 25.

Sources 16, 20, 24, and 25 and circuit 21 are connected to a control circuit 26 for synchronization and activation. The various sources and circuits may be any such elements capable of operating in accordance with this invention.

The fanout arrangement of FIG. 1 is operated with single wall domains having diameters of 125 microns in $YFeO_3$ 80 microns thick. The domains are maintained at the prescribed diameter by a bias field of 28 oersteds. Bipolar drive pulses with amplitudes of 80 milliamperes and durations of 5 microseconds are operative to move domains at 100 kHz date rate producing drive fields of 2 oersteds. The drive conductors are of gold 1 micron thick by 40 microns wide. Consecutive domain positions are defined by magnetically soft (permalloy) dots offset from the drive conductor loops to ensure unidirectional movement of domain patterns in accordance with well-known techniques. The fanout conductor (15 of FIG. 1) is connected in series with the propagation conductor (12) and the fanout domains are provided at neutral positions (of FIG. 1) defined again by permalloy dots. The dots are 0.5 microns thick by 60 microns in diameter, in sets of four for providing a stable neutral position for a domain tangent to conductor 15. A data domain in an output position spaced apart from the neutral position of domain DM1 a distance of 250 microns interact with the latter domain with a force of about 1 oersted causing displacement of the latter of the position shown by the broken circle of FIG. 3 for further displacement by the pulse in conductor 15. Consecutive legs of conductor 15 are spaced apart a distance of 400 microns and have amplitudes of 500 microns and 1,500 microns. Subsequent operation as described produces an output signal of 4 millivolts in response to a dc signal of 20 milliamperes applied to magnetoresistive detectors each of which has dimensions of 10 microns × 60 microns by 0.5 microns thick and a coercive force of about 2 oersteds. For reference, a typical output signal indicating the coupling of a single domain to a single magnetoresistive element as described is about 1 millivolt.

What has been described is considered merely illustrative of the principles of this invention. Therefore, various modifications can be devised by those skilled in the art in accordance with those principles within the spirit and scope of this invention. For example, the numbers of domains associated with consecutive loops of conductor 15 need not increase in binary fashion.

What is claimed is:

1. A magnetic domain arrangement comprising a layer of material in which single wall domains can be moved, means for selectively moving a single wall domain into a first position for detection, and means for detecting the presence of a single wall domain in said first position, said last-mentioned means comprising an electrical conductor arrangement comprising 0, 1, through N legs, an increasing number of single wall domains being associated with each of said legs in neutral positions with respect to the associated legs such that pulses therein cause only negligible movement of the associated domains, said domain associated with said 0*th* leg being disposed such that a domain in said first position displaces the former to a first position from which a pulse in said 0*th* leg moves said domain to a second position for interaction with the domains associated with the next adjacent leg.

2. An arrangement in accordance with claim 1 wherein said legs are connected electrically in series.

3. An arrangement in accordance with claim 2 wherein said means for selectively moving comprises a serpentine conductor connected electrically in series with said legs and means for providing bipolar pulses therein.

4. An arrangement in accordance with claim 3 wherein said legs are increasingly longer.

5. An arrangement in accordance with claim 4 wherein each of said domains associated with said N*th* leg couples an associated detector when moved by said pulse in said leg.

6. An arrangement in accordance with claim 5 wherein said detectors comprise magnetoresistive elements connected electrically in series and means for maintaining a dc current therein.

7. A single wall domain arrangement comprising a layer of material in which single wall domains can be moved, means for defining a stable and an astable position for each of a first, second and third domain, means for moving an information representative domain to an output position in a manner to interact with and thus offset said first domain from the associated stable to the associated astable position and first means for displacing said first domain in the associated astable position to a second position in a manner to interact with and thus offset said second and third domains to their respective astable positions.

8. An arrangement in accordance with claim 7 wherein said first means for displacing comprises a first electrical conductor, said arrangement also comprising a second electrical conductor for displacing said second and third domains from their respective astable positions.

9. An arrangement in accordance with claim 8 wherein said first and second electrical conductors are connected in series.

10. A single wall domain arrangement comprising a layer of material in which single wall domains can be moved, and means for moving first and second domains in said layer between associated stable and astable positions, said last mentioned means comprising an electrical conductor, means for defining first and second stable positions for said first and second domains neutral with respect to said conductor so that a first pulse in said conductor is inoperative to move said domains, and means for moving an information domain into a position in proximity with said first and second domains in a manner to interact with said domains for offsetting said first and second domains to said associated astable positions from which further movement thereof does occur in response to said first pulse.

11. An arrangement in accordance with claim 10 also including means for applying first and second pulses of opposite polarity to said conductor wherein said second pulse is operative to return said first and second domains to said third and fourth positions.

* * * * *